US010776810B2

(12) United States Patent
Zachrisen et al.

(10) Patent No.: US 10,776,810 B2
(45) Date of Patent: Sep. 15, 2020

(54) LOYALTY PROGRAM SYSTEM, APPARATUS, AND MEDIA (71) Applicant: TRANSFORM SR BRANDS LLC, Hoffman Estates, IL (US)

(72) Inventors: Espen Zachrisen, Bartlett, IL (US); Vinayak Hegde, Hoffman Estates, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 881 days.

(21) Appl. No.: 14/644,689

(22) Filed: Mar. 11, 2015

(65) Prior Publication Data

US 2016/0267517 A1  Sep. 15, 2016

(51) Int. Cl.
G06Q 30/00 (2012.01)
G06Q 30/02 (2012.01)

(52) U.S. Cl.
CPC .............. G06Q 30/0233 (2013.01)

(58) Field of Classification Search
None
See application file for complete search history.

(56) References Cited

U.S. PATENT DOCUMENTS

| 7,613,629 | B2 * | 11/2009 | Antonucci | B01J 23/6562 |
| | | | | 705/14.27 |
| 2003/0212595 | A1 * | 11/2003 | Antonucci | G06Q 30/02 |
| | | | | 705/14.27 |
| 2004/0249710 | A1 * | 12/2004 | Smith | G06Q 20/223 |
| | | | | 705/14.27 |
| 2013/0097035 | A1 * | 4/2013 | Rothwell | G06Q 20/20 |
| | | | | 705/17 |
| 2014/0100939 | A1 | 4/2014 | Postrel | |
| 2014/0143041 | A1 | 5/2014 | de Boer et al. | |
| 2014/0149196 | A1 | 5/2014 | Drozd et al. | |
| 2014/0278894 | A1 | 9/2014 | Toumayan et al. | |
| 2014/0365287 | A1 | 12/2014 | Pedersoli | |
| 2015/0006244 | A1 | 1/2015 | Tietzen | |
| 2015/0066623 | A1 | 3/2015 | Bufford et al. | |
| 2015/0073889 | A1 | 3/2015 | Griffiths | |
| 2015/0088626 | A1 | 3/2015 | Salmon et al. | |
| 2015/0088633 | A1 | 3/2015 | Salmon et al. | |
| 2015/0106182 | A1 | 4/2015 | Steinart et al. | |
| 2015/0120418 | A1 | 4/2015 | Cervenka et al. | |
| 2015/0120429 | A1 | 4/2015 | Salmon et al. | |

(Continued)

Primary Examiner — Meredith A Long
(74) Attorney, Agent, or Firm — McAndrews, Held & Malloy, Ltd.

(57) ABSTRACT

Systems, methods, and apparatus are disclosed for managing a loyalty program. In some embodiments, a system includes a loyalty program management (LPM) system and a point-of-sale (POS) terminal. The POS terminal is configured to read a membership identifier, identify a plurality of goods, complete a sale of the identified plurality of goods to the member, and transmit, to the loyalty program management system, the read membership identifier and information about the identified plurality of goods. Based on the received information, the LPM system is configured to identify one or more point categories, and update earned loyalty points of the member in each of the identified one or more point categories. The LPM system is further configured to provide the POS terminal with a redemption value to be applied to the sale.

20 Claims, 5 Drawing Sheets (56) References Cited

U.S. PATENT DOCUMENTS

2015/0127435 A1 5/2015 Mason
2015/0142550 A1 5/2015 Owen et al.
2015/0149272 A1 5/2015 Salmon et al.
2015/0154634 A1 6/2015 Chiu et al.

* cited by examiner

LOYALTY PROGRAM SYSTEM, APPARATUS, AND MEDIA

FIELD OF THE DISCLOSURE

The present disclosure relates generally to loyalty programs, and more specifically, to loyalty programs that award customers points based on actions of the customers.

BACKGROUND

Loyalty programs generally refer to marketing efforts that reward customer behaviors that are potentially beneficial to the company offering the loyalty program. Companies often require customers to register for a loyalty program in order to reap the associated benefits. As a result of registering, a company may assign the customer a unique account or membership number that may be used to identify the customer. A company may further issue the customer a loyalty card that is visually similar to a credit card and that includes the unique account number assigned to the customer. The cards typically have a barcode, magnet strip, RFID, or some other identifier which enables the customer's account number to be easily scanned or otherwise electronically read by a card reader commonly associated with a point-of-sale terminal or point-of-sale location (e.g. gas station pump). By presenting the card at the point of sale, the customer is typically entitled to either a discount on the current purchase, or an allotment of points that may be used for future purchases. Thus, loyalty programs may provide a form of centralized virtual currency in which reward points may be exchanged for goods or services but not back into cash.

BRIEF SUMMARY OF THE DISCLOSURE

Shown in and/or described in connection with at least one of the figures, and set forth more completely in the claims are systems, methods, and computer readable medium that enable customers to earn and/or redeem loyalty points based on a number of criteria.

These and other advantages, aspects and novel features of the present disclosure, as well as details of illustrated embodiments thereof, will be more fully understood from the following description and drawings.

DETAILED DESCRIPTION

Some disclosed embodiments are directed to a loyalty program in which members may earn and redeem points based on a number of different criteria. More specifically, some embodiments enable managers and/or other personnel to define different earn offers in which different restrictions are placed on how points earned under the different earn offers may be redeemed. For example, a first offer may award points to a customer purchasing items from a particular department (e.g., Shoe Department) that may only be redeemed or may be redeemed at a higher value on future purchases in the same department. In this manner, each department of a store may tailor earn offers under the store's loyalty program that attempt to drive or motivate certain customer behavior with respect to that department and/or other departments of the store. The above example, however, is merely illustrative. Aspects of the disclosed loyalty program management systems, methods, and computer readable media, as explained below, may define earn offers and restrict redemption of earned points in a number of other ways.

Figure 1:
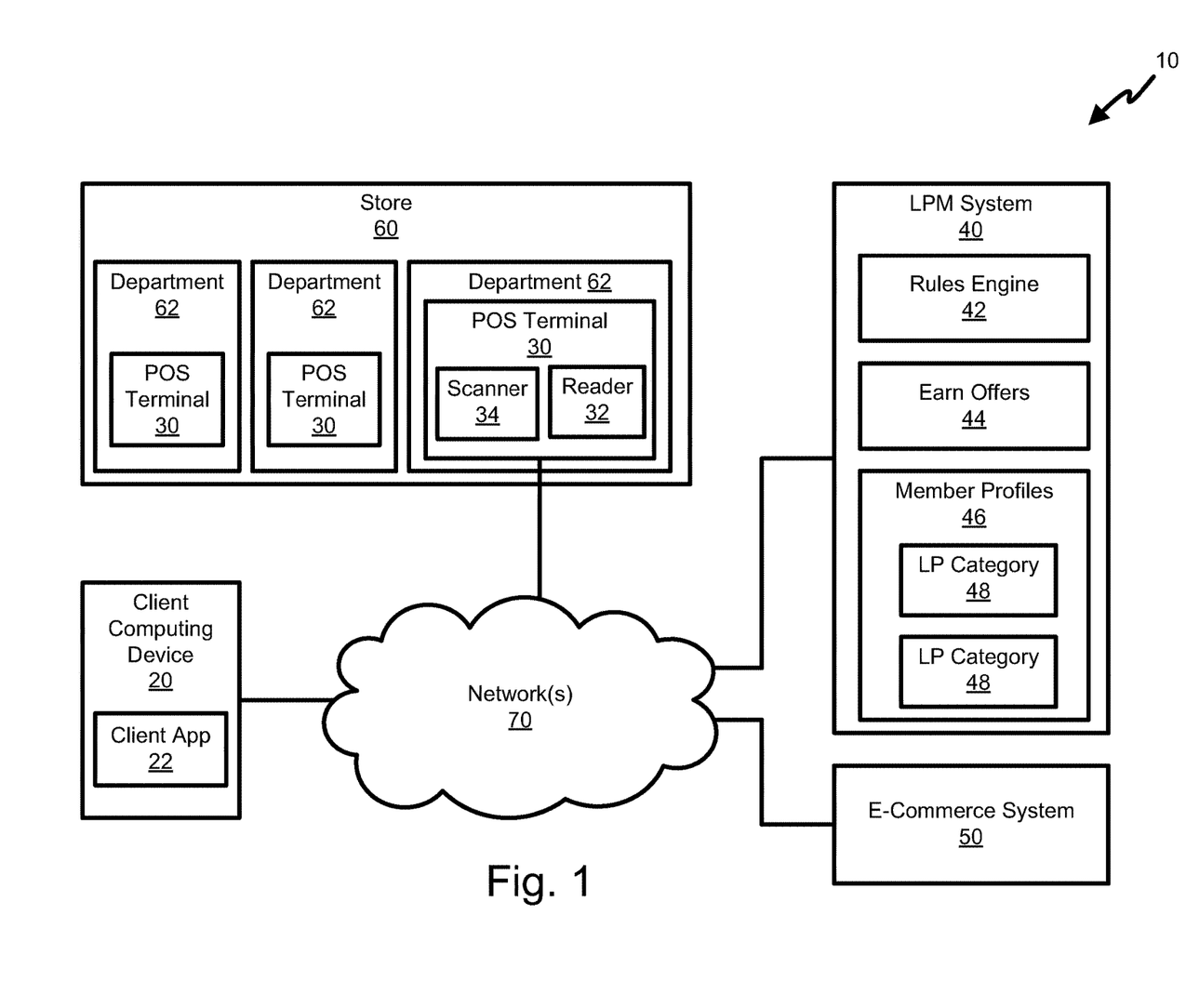
FIG. 1 shows an example loyalty program (LP) system in accordance with an example embodiment of the present disclosure.

Referring to FIG. 1, a loyalty program (LP) system 10 is depicted that facilitates the management and application of a loyalty program in which members earn points that may be redeemed to obtain discounted and/or free goods and/or services. As shown, the LP system 10 may include a client computing device 20, a point-of-sale terminal 30, a loyalty program management (LPM) system 40, and an e-commerce system 50 that are operatively coupled to a network 70.

The network 70 may include a number of private and/or public networks that collectively provide one or more communication paths that interconnect the client computing device 20, the point-of-sale terminal 30, the LPM system 40, and the e-commerce system 50. For example, the network 70 may include wireless and/or wired networks, LAN (local area network) networks, WAN (wide area network) networks, PAN (personal area network) networks, cellular networks, and/or the Internet.

The client computing device 20 may include computing devices that enable a user to communicate with the LPM system 40 and/or e-commerce system 50. For example, the client computing device 20 may be implemented as a smart phone, a tablet computing device, a laptop computing device, a desktop computing device, gaming console, wearable computing device, and/or some other computing device.

The client computing device 20 may further include a client application 22 that is executed by the client computing device 20 in order to communicate with the LPM system 40 and/or e-commerce system 50 via the network 70. To this end, the client application 22 may include an application native to the client platform that has been especially designed to provide the client computing device 20 with access to the LPM system 40 and/or e-commerce system 50. For example, if the client computing device 20 is an iPhone™, iPad™, an Apple® Watch™ or some other iOS™ device, then the client application 22 may be a native iOS™ application that has been downloaded and installed from the App Store. Similarly, if the client computing device 20 is a Windows™ computing device, the client application 22 may be a native Windows™ application.

In other embodiments, the client application 22 may not be an application that is native or otherwise specifically designed for the respective computing platform. Instead, the client application 22 may be implemented as a Web application in which various Web and/or Internet technologies, such as Hyper-Text Markup Language (HTML) pages, Javascript, etc., configure a web browser of the client computing device 20 to provide the client computing device 20 with access to the LPM system 40 and/or e-commerce system 50.

As shown, the LP system 10 may include one or more point-of-sale (POS) terminals 30 associated with a retail establishment or store 60. In general, the POS terminals 30 permit an employee or a customer purchasing the items to scan or otherwise identify the items being purchased, determine the cost of the items being purchased, and effectuate payment for the items in order to complete the purchase or transfer of the items to a customer.

Figure 5:
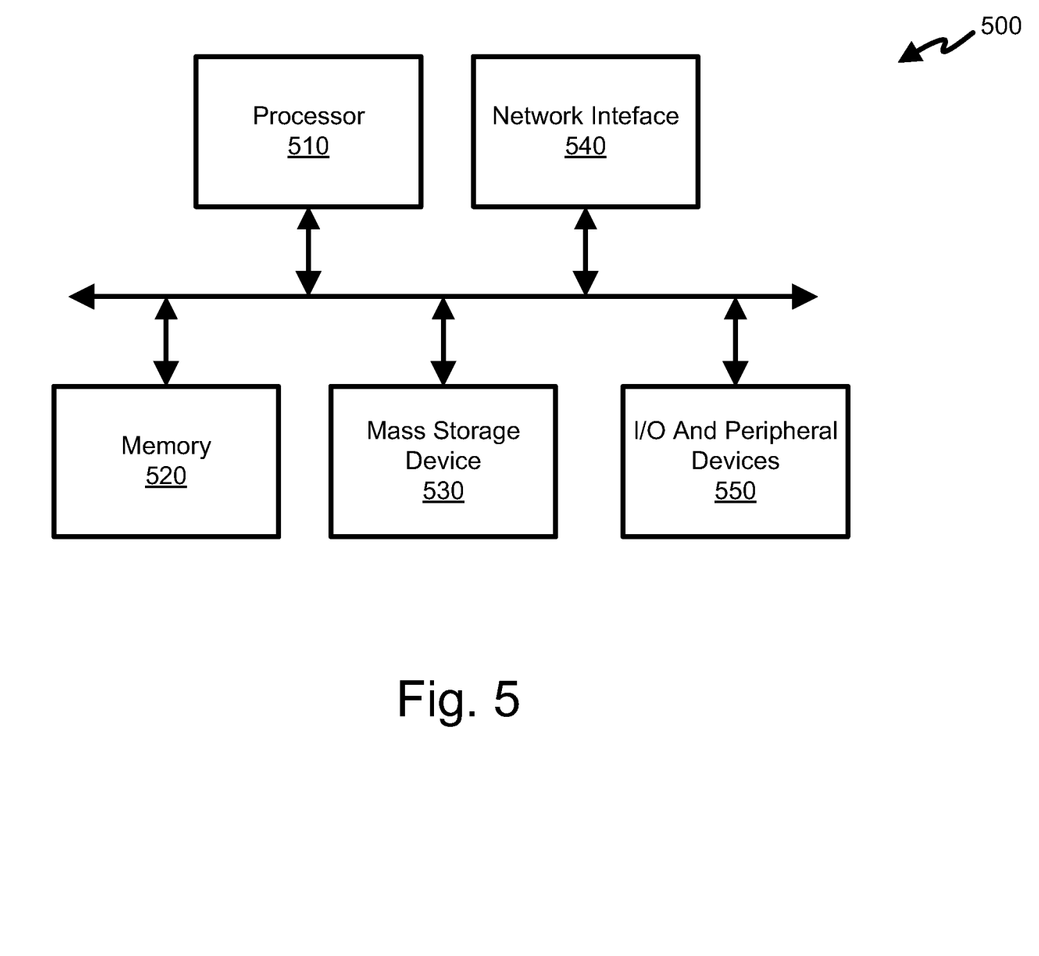
FIG. 5 shows a simplified depiction of an example computing device for use in the example LP system of FIG. 1.

To this end, the POS terminals 30 may be implemented using a computing device that includes hardware similar to a general computing device such as that shown in FIG. 5. However, besides hardware similar to that found in a general computing device, a POS terminal 30 may include additional hardware and/or peripherals not found in a typical computing device. For example, a POS terminal 30 may include a cash drawer, receipt printer, customer display in addition to a main display for the operator, a conveyor belt, a weight scale, a signature capture device, and a customer pin pad device. The POS terminal 30 may further include a membership identifier (ID) reader 32 and a scanner 34. The scanner 34 may scan or read product identifiers from items being purchased. In particular, the scanner 34 may include a universal product code (UPC) barcode scanner that is configured to read UPC codes from the items being purchased.

The membership ID reader 32 may take on various forms depending upon the manner membership IDs are provided to the members of the loyalty program. In some embodiments, members may be given a membership card that has a magnetic stripe similar to those found on credit cards and debit cards. In such embodiments, the membership ID reader 32 may comprise a magnetic strip reader similar to those used to read a swiped credit/debit card. Moreover, in such embodiments, the POS terminal 30 may include a single reader that is capable or reading both credit/debit cards as well as membership ID cards provided to the members of the loyalty program.

In some embodiment, the membership card may have a barcode similar to the UPC codes found on the goods offered for purchase. In such embodiments, the membership ID reader 32 may comprise a barcode reader similar to those used to scan the UPC codes on the items being sold. Moreover, in such embodiments, the POS terminal 30 may include a single scanner 34 that is capable or reading both barcode on the issued membership card as well as the UPC codes on the items being sold. Accordingly, in some embodiments, the reader 32 and the scanner 34 are provided by the same hardware element of the POS terminal 30. In yet other embodiments, members may be presented with a key fob or other device from which the assigned membership ID may be obtained. For example, the membership ID reader 32 may include an RFID transceiver, Near Field Communication (NFC) transceiver, or some other suitable device to read, scan, or otherwise interrogate the key fob in order to obtain the assigned membership ID.

In further embodiments, members may be not be presented with a physical membership card or other identifying hardware. In such embodiments, the membership ID reader 32 may include a keypad or other input device that enables an employee or the member to enter their membership ID number. In such embodiments, the membership ID number may be the same as their telephone number or other some other unique identifier easily remembered by the member.

The LPM system 40 may generally manage a loyalty program. In particular, the LPM system 40 may award loyalty points to members of the loyalty program based on various activities performed by the members. The LPM system 40 may also enable the members to later redeem earned loyalty points which may be used to partially or fully cover the cost of one or more purchased items such as goods and/or services.

To this end, the LPM system 40 may include a rules engine 42 that is configured to process rules and/or criteria specified by one or more earn offers 44 in order to determine whether a particular earn offer 44 applies to a LP earn event and/or a LP redemption request. The LPM system 40 may further include member profiles 46 that include various information about a particular member of the loyalty program. For example, each member profile 46 may include contact information (e.g., name, mailing address, shipping address, phone number, email address), payment information (e.g., debit card number, credit card number, checking account number, etc.), and a purchase history that identifies the items the respective member has purchased in the past. Each member profile 46 may further specify the number of loyalty points that the respective member has earned in each of a several different point categories 48. For example, a loyalty point program may include a point category in which the earned points are not restricted and may be redeemed with respect to any item associated with the store 60. Other point categories 48, however, may restrict redemption of points to particular items, may specify increased redemption values if redeemed for particular items, and/or may specify decreased redemption values if redeemed for particular items.

The e-commerce system 50 generally provides a storefront that a member may access via client computing device 20 in order to browse, research, and/or purchase items. In some embodiments, the e-commerce system 50 further permits members to utilize the services of the LPM system 40 with respect to purchases made via the e-commerce system 50. In particular, the e-commerce system 50 may enable members to earn loyalty points on purchases made via the e-commerce system 50 as well as redeem earned loyalty points to partially or completely cover the cost of one or more items purchased via the e-commerce system 50.

The LPM system 40 and the e-commerce system 50 may each include one or more web servers, database servers, routers, load balancers, and/or other computing and/or networking devices. However, in some embodiments, the LPM system 40 and e-commerce system 50 may share one or more assets and/or devices instead of maintaining separate assets and/or devices. For example, the LPM system 40 and e-commerce system 50 may share one or more database servers used to maintain member profiles 46 for members registered with loyalty program managed by the LPM system 40 and/or members who have registered with or purchased items from the e-commerce system 50.

As shown, the store 60 may have several different departments 62 that operate within the same brick-and-mortar location. For example, a retail store 60 may have a shoe department 62, a men's clothing department 62, a women's clothing department 62, a home electronics department 62, etc. that each focus on providing a particular class or category of items for purchase. For some stores 60, each department 62 may have their own manager, their own budget, and maintain their own profit/loss metrics. As such, each department 62 may have an interest in limiting or controlling the way a loyalty program operates with respect to their items on offer. Accordingly, in some embodiments, the LPM system 40 enables managers to define earn offers 44 that apply to their respective departments 62 and/or favor or otherwise incentives members to purchase items from their respective departments 62.

To this end, the LPM system 40 may enable managers and/or other store employees to define one or more earn offers 44. In particular, the LPM system 40 may enable such managers and/or store employs to specify the "what," "when," "where," and "how much" with respect to a particular earn offer 44. More specifically, an earn offer 44 may specify "what" activities or tasks are associated with the earn offer 44. For example, the earn offer 44 may specify the items that a member must purchase in order for the earn offer 44 to apply. The earn offer 44 may specify the items in a number of different ways such as specifying a particular make, model, brand, product category, price, department 62, and/or some other criteria that may be used to describe a particular item.

The earn offer 44 may further specify "when" the activity or task associated with the earn offer 44 must occur in order for the earn offer 44 to apply. For example, the earn offer 44 may specify a start and an end for the earn offer 44. In particular, the start may specify a beginning date and/or time for the earn offer 44 and the end may specify and ending date and/or time for the earn offer 44. As such, the earn offer 44 may only be active or otherwise valid during the duration defined by the specified start and end for the earn offer 44.

Moreover, the earn offer 44 may specify "where" the activity or task must occur for the earn offer 44 to apply. For example, the earn offer may specify that the activity must occur on-line, in a store, at a specific store, in a specific city, in a specific state, in a specific region, etc.

The earn offer 44 may further specify "how much" a member may earn via the earn offer. In particular, an earn offer 44 may specify a value, an exchange rate, or some technique for calculating the number of points earned under an earn offer 44. For example, an earn offer 44 may specify that the member will earn a point for every cent spent on items covered by the earn offer 44. Other earn offers 44 may specify that the member will earn a fixed number of points (e.g., 500) for completing the task associated with the earn offer 44 (e.g., purchasing a certain item). The earn offer 44 may further specify a maximum to be earned under the earn offer 44. The maximum may be a cumulative value that limits the number of loyalty points in total to be awarded under the earn offer 44 (e.g., 2,000,000). In other embodiments, the maximum may specify a maximum to be earned by a single member under the earn offer 44 (e.g., 1,000).

Besides specifying the "what," "when," "where," and "how much" with respect to earning points under an earn offer 44, the earn offer 44 may further specify the "what," "when," "where," and "how much" for redeeming points earned via the earn offer 44. These redemption criteria operate in a similar manner as the earning criteria. Namely, the earn offer 44 may specify to what activities or tasks the points earned via the earn offer 44 may be applied. The earn offer 44 may further specify when the activity or tasks associated with the earn offer 44 must occur in order for the earned points to be applied. For example, the earn offer 44 may specify a start and an end for when the earned points may be applied. Moreover, the earn offer 44 may specify where the activity or task must occur for the earned points to apply. For example, the earn offer may specify that the activity must occur on-line, in a store, at a specific store, in a specific city, in a specific state, in a specific region, etc. Furthermore, the earn offer 44 may specify how much the points are worth when redeemed. For example, the earn offer 44 may specify a multiplier that effectively increases the number points and thus the redemption value of the earned points if the points are redeemed for certain items, for items at a particular store 60, for items from a particular department 62, or based on some other criteria.

FIG. 1 depicts an example embodiment of a LP system 10. However, the LP system 10 may be implemented in numerous different manners using a wide range of different computing devices, platforms, networks, IoT devices, etc. In particular, the LP system 10 is depicted with a single client computing device 20, a single point-of-sale terminal 30 per department 62, a single LPM system 40, and a single e-commerce system 50. However, other embodiments may include multiple client computing devices 20, point-of-sale terminals 30, LPM systems 40, and/or e-commerce systems 50. Moreover, aspects of the LP system 10 may be implemented using a client/server architecture, a peer-to-peer (P2P) architecture, and/or another networking architecture. Such embodiments are envisioned and protection for such embodiments is sought to the extent encompassed by the appended claims.

Figure 2:
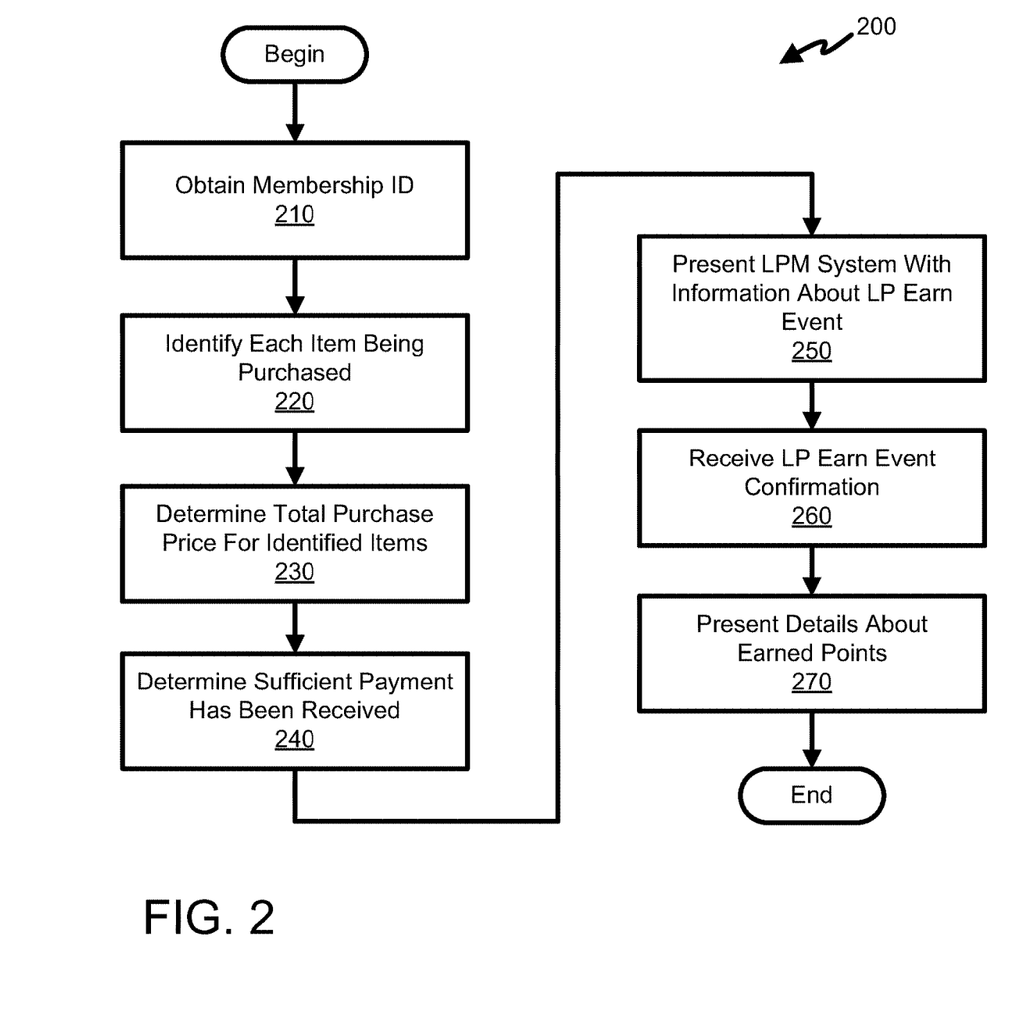
FIG. 2 shows a flow chart of a process that may be implemented by an example POS terminal of the LP system shown in FIG. 1.

Referring now to FIG. 2, a flow chart is shown for a process 200 that may be implemented by a POS terminal 30 of the LP system 10 to generate an earn event. In general, FIG. 2 depicts a process by which the POS terminal 30 may generate an earn event based on items purchased by a member. However, in some embodiments, the e-commerce system 50 may generate a similar earn event based on items purchased by a member via a presented storefront. Moreover, a loyalty program may award points based on a number of different earn events besides the earn event described with respect to FIG. 2. In particular, managers and/or other employs of the store 60 may define via the LPM system 40 earn offers that offer to award loyalty points to members of the loyalty program for (i) listening to music or a song, (ii) for watching a movie, (iii) for completing a survey, (iv) for watching an advertisement, and/or (v) for completing some other task that the store 60 or a third party affiliated with the store 60 finds value in the member performing. Accordingly, while FIG. 2 is primarily described from the standpoint of a retail environment in which purchased items generate an earn event to be processed by the LPM system 40, a earn events may be defined based upon any of the above noted activities as well as others for which the store 60 and/or affiliated third party find it worthwhile to incentives.

As shown, a POS terminal 30 may obtain at 210 the membership ID of a member who is purchasing one or more items. For example, a store employee or the member may swipe a LP card through reader 32 so that the read 32 may read the membership ID from the LP card and obtain the membership ID for the member. In another embodiment, the reader 32 may wirelessly interrogate a key fob or other device assigned to the member and provide the obtained membership ID for the member to the POS terminal 30. The POS terminal 30 at 220 may further identify each of the items that the member intends to purchase. For example, a store employee and/or the member may use scanner 34 to scan UPC barcodes or other product identifiers from each of the items to be purchased. In this manner, the POS terminal 30 may receive product identifiers for each of the items and thus identify the items the member intends to purchase.

At 230, the POS terminal 30 may determine a total purchase price for the identified items and present the total purchase price to the member for payment. For example, the POS terminal 30 may display the total purchase price on a display device of the POS terminal 30 in order to inform a store employee and/or the member of the determined purchase price. The POS terminal 30 at 240 may determine that sufficient payment has been received for the identified items.

In particular, an employee may receive cash, check, credit card, and/or debit card from the member and provide the POS terminal 30 with the amount received and/or the credit/debit card information so that the POS terminal 30 may finalize payment.

Before or after finalizing payment, the POS terminal 30 at 250 may present the LPM system 40 with information about the LP event. In particular, the POS terminal 30 may present the LPM system 40 with information about the items purchased or to be purchased. The POS terminal 30 may further provide the LPM system 40 with the membership ID of the member purchasing the identified items. As a result of presenting the LPM system 40 with such information about the LP event, the POS terminal 30 at 260 may receive an LP event confirmation from the LPM system 40. The LP event confirmation may identify one or more point categories for which the LP event earned loyalty points as well as the number of loyalty points earned for each of the one or more identified point categories.

At 270, the POS terminal 30 may present the member with details regarding the loyalty points earned as a result of the LP event. For example, the POS terminal 30 in one embodiment may print a sales receipt that identifies the purchased items and that further identifies the points earned as a result of purchasing the items. The sales receipt may further provide the member with information regarding any restrictions and/or promotions with respect to redeeming the just earned loyalty points. For example, the sales receipt may indicate the member earned 100 points that may be redeemed only for future purchases of products from a given department 62. As another example, the sales receipt may indicate the member earned 200 points that may be redeemed for future purchases of products from a given department 62 at a specified multiple (e.g. 2×).

Figure 3:
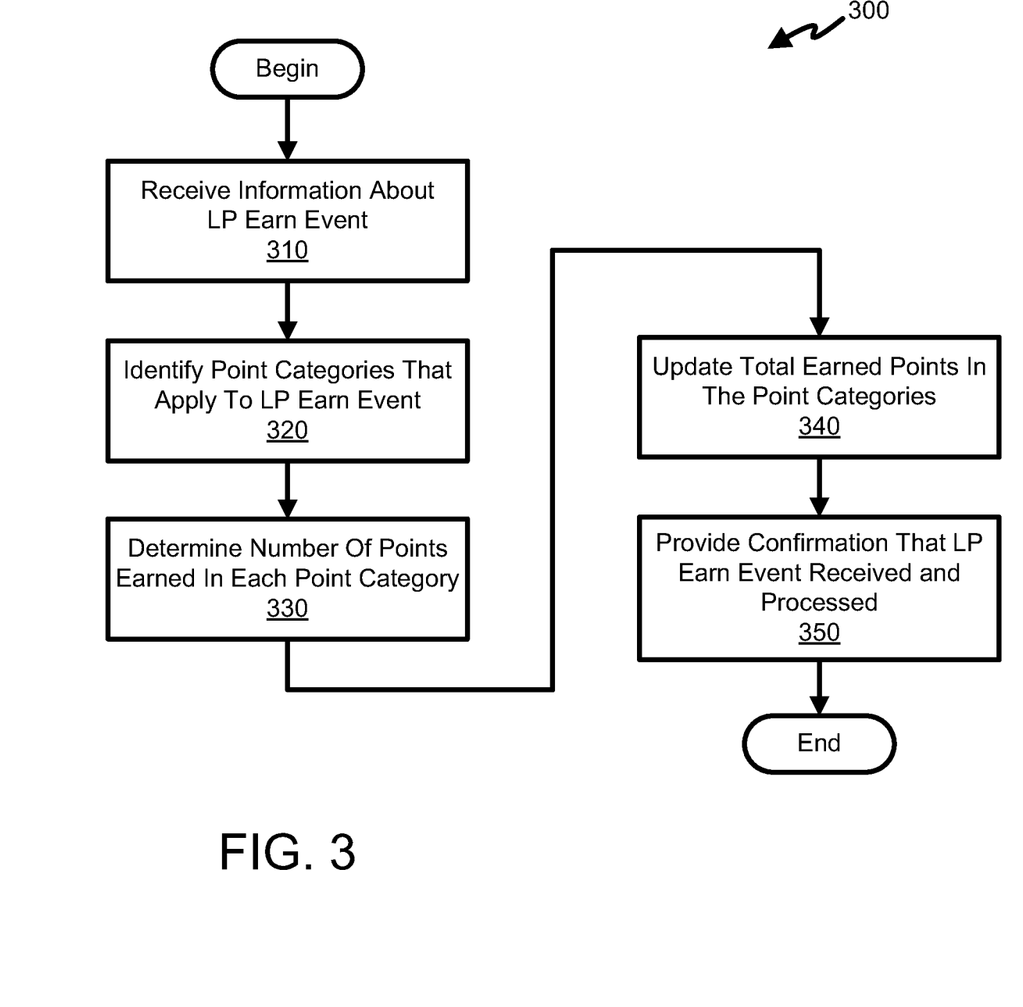
FIG. 3 shows a flow chart of a process for awarding loyalty points to members of a loyalty program that may be implemented by the example LP system of FIG. 1.

Referring now to FIG. 3, a flow chart is shown for a process 300 that may be implemented by the LPM system 40 to award loyalty points to a member. In general, FIG. 3 depicts awarding points in a retail environment based on items purchased by a member. However, as explained above, a loyalty program may award points based on a number of different LP earn events. Accordingly, while FIG. 3 is primarily described from the standpoint of a retail environment in which purchased items results in a LP earn event to be processed by the LPM system 40, the process 300 is generally applicable to handling of other types of LP earn events as well.

As shown, the LPM system 40 at 310 may receive information about a LP earn event. In particular, the LP earn event may be generated or otherwise triggered in response to a member of the loyalty program completing and/or performing some specified task. For example, in one embodiment, an LP earn event may result from a member purchasing items from a POS terminal 30 or an e-commerce system 50. In such an embodiment, the LPM system 40 may receive information regarding each item purchased and the membership ID for the member that purchased the items.

At 320, the LPM system 40 may identify point categories 48 that apply to the LP earn event being processed. To this end, the LPM system 40 may evaluate the received LP earn event with respect to previously defined earn offers 44 to determine which earn offers 44 apply to the LP earn event and which point categories 48 are associated with the applicable earn offers 44. As a result of such evaluation, the LPM system 40 may determine that one or more point categories 48 apply to the LP earn event. To this end, the rules engine 42 of the LPM system 40 may analyze the received LP earn event and determine whether any of the earn offers 44 apply and thus identify which point categories 48, if any, apply to the LP earn event.

The LPM system 40 at 330 may determine the number of points earned under each applicable point category 48 specified by the earn offers that apply to the received LP event. In particular, the LPM system 40 may determine that more than one earn offer 44 applies and/or that an earn offer 44 specifies more than one point category 48 that applies to the received LP event. For each applicable point category 48, the LPM system 40 may determine the number of points earned by the member due to the received LP event. At 340, the LPM system 40 may then update a member profile 46 to reflect the changes in earned points in the respective point categories 48. In particular, for each applicable point category 48, the LPM system 40 may update a member profile 46 for the respective member to reflect the increased point values in the respective point categories 48.

As shown at 350, the LPM system 40 may further provide a confirmation that the LP event was received and the effect if any the LP event had on the member's earned points. In particular, the confirmation may specify the number of points the LP event earned the member in each point category.

Figure 4:
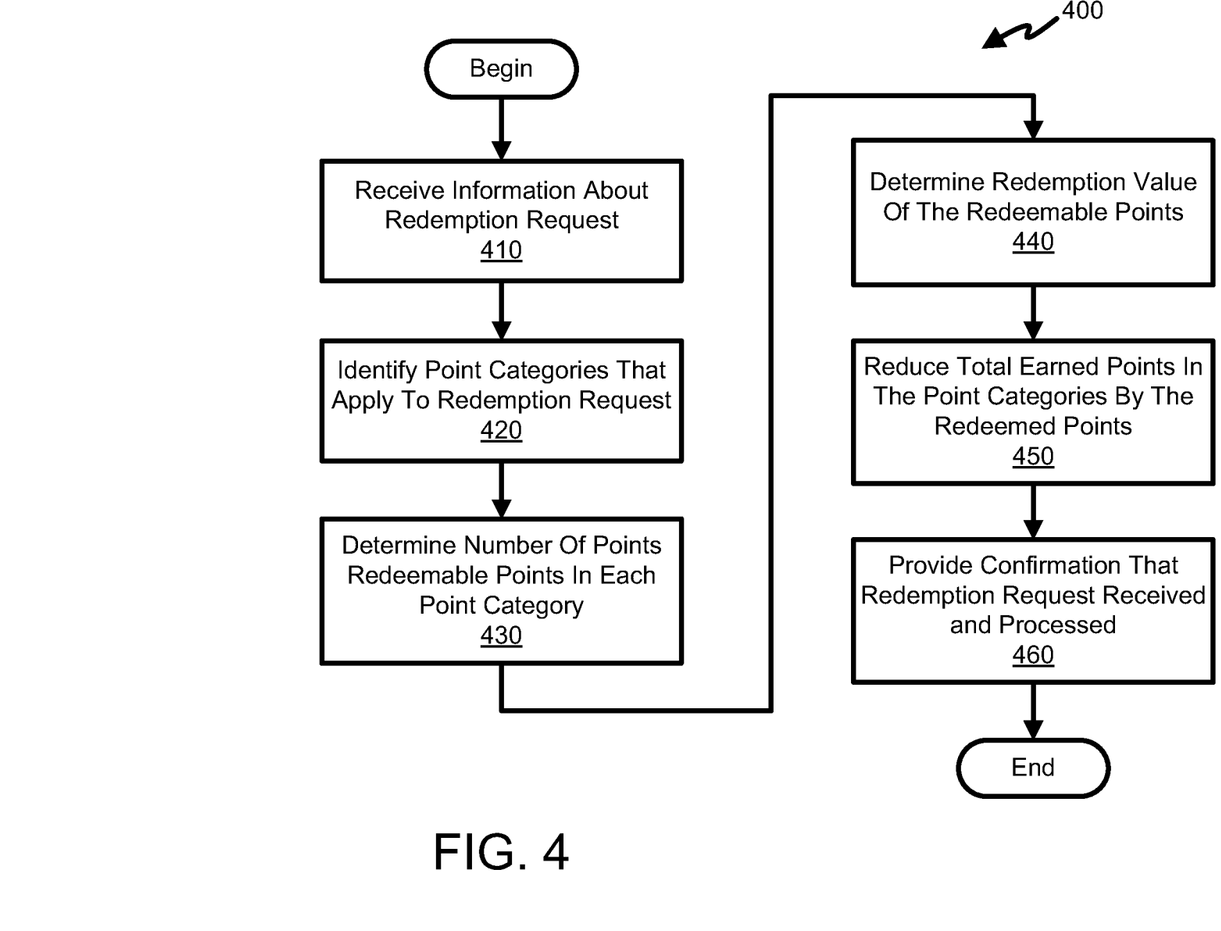
FIG. 4 shows a flow chart of a process for processing a request to redeem loyalty points that may be implemented by the example LP system of FIG. 1.

Referring now to FIG. 4, a flow chart is shown for a process 400 that may be implemented by the LPM system 40 to process point redemption requests. In general, FIG. 4 depicts the process of handling the redemption of points in a retail environment wherein the redeemed points are used to partially and/or complete cover the cost of one or more purchased items.

As shown, the LPM system 40 at 410 may receive a redemption request. In particular, the redemption request may be generated in response to a member of the loyalty program completing and/or performing some specified task. For example, in one embodiment, the redemption request may result from a member purchasing items from a POS terminal 30 or an e-commerce system 50. In such an embodiment, the redemption request may provide the LPM system 40 with information regarding each item purchased and the membership ID for the member that purchased the items.

At 420, the LPM system 40 may identify point categories that apply to the redemption request. To this end, the LPM system 40 may evaluate the received redemption request with respect to previously defined earn offers 44 to determine which earn offers 44 apply to the redemption request and which point categories 48 are associated with the applicable earn offers 44. As a result of such evaluation, the LPM system 40 may determine that one or more point categories 48 apply to the redemption request. To this end, the rules engine 42 of the LPM system 40 may analyze the received redemption request to determine whether any of the earned points in the point categories 48 apply to the redemption request.

The LPM system 40 at 430 may determine for each point category 48 that applies to the received redemption request, the number of points the member has earned. In particular, the LPM system 40 may determine that more than one earn offer 44 applies and/or that an earn offer 44 specifies more than one point category 48 that applies to the received redemption request. For each, applicable point category 48, the LPM system 40 may determine the number of earned points in each applicable point category to be applied to the redemption request.

After determine which earned points apply, the LPM system at 440 may determine the redemption value of the earned points. As noted above, earn offers 44 may limit and/or enhance earned points in various ways. For example, an earn offer 44 may specify a multiplier that increases the redemption value of earned points if used to purchase certain items. An earn offer 44 may further limit the number of earned points that may be redeemed at once. The LPM system at 440 may take into account each of these stipulations upon the redemption of the earned points in light of the items being purchased and determine which earned points are being redeemed and the total redemption value of redeeming such earned points.

At 450, the LPM system 40 may then update the member profile 46 to reflect the changes in earned point in the respective point categories 28. In particular, for each applicable point category 48, the LPM system 40 may update a member profile 46 for the respective member to reflect the decrease in point values due to the redemption of points in the respective point categories 48.

As shown at 460, the LPM system 40 may further provide a confirmation that the redemption request was received and the effect, if any, the redemption request had on the member's earned points. In particular, the confirmation may specify the number of redeemed points each point category 48. Moreover, the confirmation may specify the total redemption value of the redeemed points. The redemption value may be used by a POS terminal 30 or the e-commerce system 50 to partially or completely cover the purchase price of one or more items being purchased by the member.

In some embodiments, the client computing devices 20, the POS terminals 30, LPM system 40, and/or e-commerce system 50 may be implemented using various types of computing devices and/or embedded computing devices. FIG. 5 provides a simplified depiction of a computing device 500 suitable for such aspects of LP system 10. As shown, the computing device 500 may include a processor 510, a memory 520, a mass storage device 530, a network interface 540, and various input/output (I/O) and peripheral devices 550. The processor 510 may be configured to execute instructions, manipulate data and generally control operation of other components of the computing device 500 as a result of its execution. To this end, the processor 510 may include a general purpose processor such as an x86 processor or an ARM processor which are available from various vendors. However, the processor 510 may also be implemented using an application specific processor, microcontroller, and/or other circuitry.

The memory 520 may include various types of random access memory (RAM) devices, read only memory (ROM) devices, flash memory devices, and/or other types of volatile or non-volatile memory devices. In particular, such memory devices of the memory 520 may store instructions and/or data to be executed and/or otherwise accessed by the processor 510. In some embodiments, the memory 520 may be completely and/or partially integrated with the processor 510.

In general, the mass storage device 530 may store software and/or firmware instructions which may be loaded in memory 520 and executed by processor 510. The mass storage device 530 may further store various types of data which the processor 510 may access, modify, and/otherwise manipulate in response to executing instructions from memory 520. To this end, the mass storage device 530 may comprise one or more redundant array of independent disks (RAID) devices, traditional hard disk drives (HDD), sold state device (SSD) drives, flash memory devices, read only memory (ROM) devices, and/or other types of non-volatile storage devices.

The network interface 540 may enable the computing device 500 to communicate with other computing devices via network 70. To this end, the networking interface 540 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc) or near field communication (NFC) interface, and/or some other type of networking interface capable of providing a communications link between the computing device 500 and network 70 and/or another computing device.

Finally, the I/O and peripheral devices 550 may generally provide devices which enable a user to interact with the computing device 500 by either receiving information from the computing device 500 and/or providing information to the computing device 500. For example, the I/O and peripheral devices 550 may include display screens, keyboards, mice, touch screens, microphones, audio speakers, digital cameras, optical scanners, RF transceivers, etc. The I/O and peripheral devices 550 for a POS terminal 30 may especially include a cash drawer, receipt printer, a conveyor belt, a weight scale, a signature capture device, a customer pin pad device, a membership ID reader, and product scanner.

While the above provides some general aspects of a computing device 500, those skilled in the art readily appreciate that there may be significant variation in actual implementations of a computing device. For example, a smart phone implementation of a computing device generally uses different components and may have a different architecture than a database server implementation of a computing device. However, despite such differences, computing devices generally include processors that execute software and/or firmware instructions in order to implement various functionality. As such, the above described aspects of the computing device 500 are not presented from a limiting standpoint but from a generally illustrative standpoint. The present application envisions that aspects of the present application may find utility across a vast array of different computing devices and the intention is not to limit the scope of the present application to a specific computing device and/or computing platform beyond any such limits that may be found in the appended claims.

Various embodiments have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a tangible, computer readable storage medium such as, for example, flash memory devices, hard disk devices, compact disc media, DVD media, EEPROMs, etc. Such instructions, when executed by one or more computing devices, may result in the one or more computing devices performing various aspects of the processes depicted in FIGS. 2-4.

While the present disclosure has described certain embodiments, it will be understood by those skilled in the art that various changes may be made and equivalents may be substituted without departing from the intended scope of protection. In addition, many modifications may be made to adapt a particular situation or material to the teachings of the present disclosure without departing from its scope. Therefore, it is intended that the present disclosure not be limited to the particular embodiment or embodiments disclosed, but encompass all embodiments falling within the scope of the appended claims.

What is claimed is:

1. A method of a loyalty program management (LPM) system that manages a loyalty program for a store having a plurality of departments, the method comprising:
reading, with a reader of a point-of-sale (POS) terminal, a code from a physical item, wherein the code is representative of a membership identifier assigned to a member of the loyalty program;
scanning, with a scanner of the POS terminal, a product code from an item, wherein the product code identifies the item;
completing, with the POS terminal, a purchase of the item;
receiving, with a server of the LPM system, information about an earn event of the loyalty program from the POS terminal operatively coupled to the server of the LPM system via a network, in response to the member of the loyalty program triggering the earn event;
identifying, with the server of the LPM system, one or more earn offers that apply to the purchased item of the earn event, wherein the LPM system identifies the one or more earn offers based on the information received from the POS terminal and a plurality of earn offers comprising a first earn offer that favors a first department of the store over other departments of the store;
identifying, with the server of the LPM system based on the one or more earn offers that apply to the purchased item of the earn event and the information received from the POS terminal, a plurality of point categories for the purchased item of the earn event;
determining, with the server of the LPM system based on the received information and the one or more earn offers that apply to the purchased item of the earn event, a quantity of loyalty points earned in each point category of the plurality of point categories due to the purchased item; and
updating, with the server of the LPM system, earned loyalty points of the member in each point category of the plurality of point categories to include the quantity of loyalty points earned in each point category of the plurality of point categories due to the purchased item.

2. The method of claim 1, further comprising:
transmitting a confirmation from the server of the LPM system to the POS terminal, the confirmation indicating the quantity of loyalty points that the purchased item earned the member in each of the plurality of point categories; and
presenting to the member, via the POS terminal in response to completing the purchase of the item, the quantity of loyalty points indicated by the confirmation that the purchased item earned the member in each of the plurality of point categories.

3. The method of claim 1, wherein an earn offer of the one or more earn offers specifies the plurality of point categories based on when and where the purchased item was purchased.

4. The method of claim 1, wherein:
the purchased item is associated with the first department the store; and
the first earn offer specifies that the plurality of point categories comprise a point category that restricts redemption of earned points in the point category to a future purchase of one or more items associated with the first department.

5. The method of claim 1, wherein:
the purchased item is associated with the first department the store; and
the first earn offer specifies that the plurality of point categories include a point category that specifies a greater redemption value for earned points in the point category, when applied to a first future purchase associated with the first department, than to a second future purchase associated with one of the other departments for the store.

6. The method of claim 1, further comprising:
identifying, with the server of the LPM system, an earn offer based on received information associated with completing a task other than purchasing goods;
identifying, with the server of the LPM system, a second plurality of point categories specified for the task;
determining, with the server of the LPM system based on the received information associated with completing the task, a quantity of loyalty points earned in each point category of the plurality of point categories due to completing the task; and
updating, with the server of the LPM system, earned loyalty points of the member in each point category of the second plurality of point categories to include the quantity of loyalty points earned in each point category of the second plurality of point categories due completing the task.

7. One or more non-transitory computer-readable media, comprising a plurality of instructions, that in response to being executed by a point-of-sale (POS) terminal and one or more servers of a loyalty program management system, result in:
the POS terminal:
reading, with a reader of the POS terminal, a code from a membership card, wherein the code is representative of a membership identifier assigned to a member of the loyalty program;
scanning, with a scanner of the POS terminal, a product code from an item, wherein the product code identifies the item;
completing, with the POS terminal, a purchase of the item;
the one or more servers of the LPM system:
receiving information about an earn event of the loyalty program from the POS terminal operatively coupled to the one or more servers of the LPM system via a network, in response to the member of the loyalty program purchasing the item, the information including the code read by the POS terminal from the membership card and the product code scanned by the POS terminal from the purchased item;
identifying one or more earn offers that apply to the item based on the information received from the POS terminal and a plurality of earn offers comprising a first earn offer that favors a first department of a store over other departments of the store;
identifying a plurality of point categories for the purchased item based on the information received from POS terminal and the one or more earn offers that apply to the purchased item;
determining, based on the information received from the POS terminal and the one or more earn offers that apply to the purchased item, a quantity of loyalty points earned in each point category of the plurality of point categories due to the purchased item; and
updating, in a database of the one or more servers, earned loyalty points of the member in each point category of the plurality of point categories to reflect the quantity of loyalty points earned in each point category of the plurality of point categories due to the purchased item.

8. The one or more non-transitory computer-readable media of claim 7, wherein the plurality of instructions further result in the one or more servers of the LPM system transmitting a confirmation to the POS terminal, the confirmation indicating the quantity of loyalty points that the purchased item earned the member in each point category of the one or more point categories.

9. The one or more non-transitory computer-readable media of claim 7, wherein an earn offer of the one or more earn offers specifies the plurality of point categories for the purchased item based on when and where the purchased item was purchased.

10. The one or more non-transitory computer-readable media of claim 7, wherein:
the purchased item is associated with the first department the store; and
the first earn offer specifies that the plurality of point categories comprise a point category that restricts redemption of earned points in the point category to a future purchase associated with the first department.

11. The one or more non-transitory computer-readable media of claim 7, wherein:
the purchased item is associated with the first department of the store; and
the first earn offer specifies that the plurality of point categories include a point category that specifies a greater redemption value for earned points in the point category when applied to a first future purchase associated with the first department than to a second future purchase associated with one of the other departments for the store.

12. The one or more non-transitory computer-readable media of claim 7, wherein an earn offer of the one or more earn offers specifies a cumulative value that limits a number of loyalty points in total to be awarded under the earn offer.

13. The one or more non-transitory computer-readable media of claim 7, wherein an earn offer of the one or more earn offers specifies a maximum to be earned by a single member under the earn offer.

14. A system for implementing a loyalty program, the system comprising:
a loyalty program management (LPM) system including one or more servers, wherein the one or more servers includes at least one database server configured to store loyalty points earned by a plurality of members in the loyalty program; and
a point-of-sale (POS) terminal comprising:
a reader configured to read, from a physical item, a code that is representative of a membership identifier assigned to a member of the plurality of members; and
a scanner configured to read a plurality of product codes from a plurality of goods, wherein each product code identifies a respective good of the plurality of goods,
wherein the POS terminal is configured to identify the plurality of goods based on the plurality of product codes read by the scanner, complete a sale of the identified plurality of goods to the member, and transmit, to the one or more servers of the LPM system, the membership identifier associated with the code read by the reader and information about the identified plurality of goods, and
wherein the one or more servers of the LPM system are further configured to:
receive the read membership identifier and the information about the identified plurality of goods,
identify one or more earn offers that apply to a good of the identified plurality of goods based on the received information and a plurality of earn offers comprising a first earn offer that favors a first department of a store over other departments of the store,
identify a plurality of point categories for the good of the identified plurality of goods based on the received information and the one or more earn offers that apply to the good of the identified plurality of goods,
determine, based on the information about the identified plurality of goods and the one or more earn offers that apply to the good of the identified plurality of goods, a quantity of loyalty points earned in each point category of the plurality of point categories for the good, and
update, via the at least one database server, the loyalty points of the member in each point category of the plurality of point categories to reflect the quantity of loyalty points earned in each point category of the plurality of point categories due to the good of the plurality of identified goods.

15. The system of claim 14, wherein the one or more servers of the LPM system are further configured to transmit, to the POS terminal, a confirmation indicating the quantity of loyalty points the member earned in each point category of the plurality of point categories due to the good of the plurality of goods.

16. The system of claim 14, wherein the one or more servers of the LPM system are further configured to:
receive a redemption request, from the POS terminal prior to completing the sale to the member, the redemption request including the membership identifier and the information about the identified plurality of goods;
determine a redemption value for earned points based on a plurality of qualifying point categories for the identified plurality of goods and earned points for the member in the plurality of qualifying point categories; and
transmit, to the POS terminal, the redemption value to apply to the sale of the identified plurality of goods.

17. The system of claim 16, wherein the POS terminal is further configured to reduce a total purchase price for the identified plurality of goods by the redemption value received from the one or more servers of the LPM system.

18. The system of claim 16, wherein the one or more servers of the LPM system are further configured to restrict redemption of earned points in a first point category to one or more goods of the first department of the store.

19. The system of claim 16, wherein the one or more servers of the LPM system are further configured to determine the redemption value by assigning a greater value to earned points in a first point category, when applied to goods associated with the first department of the store, than to goods associated with a second department of the store.

20. The system of claim 16, wherein the one or more servers of the LPM system are further configured to determine the redemption value by limiting a number of earned points redeemed at once.

* * * * *